United States Patent [19]
Urban

[11] Patent Number: 5,311,474
[45] Date of Patent: May 10, 1994

[54] RANDOM ACCESS OPTICAL STORAGE

[75] Inventor: Norbert Urban, Gäufelden-Nebringen, Fed. Rep. of Germany

[73] Assignee: International Business Machines Corp., Armonk, N.Y.

[21] Appl. No.: 776,147

[22] Filed: Oct. 15, 1991

[30] Foreign Application Priority Data

Oct. 20, 1990 [EP] European Pat. Off. ........ 90120141.8

[51] Int. Cl.$^5$ ............................................. G11C 13/04
[52] U.S. Cl. .................................... 365/215; 365/106; 365/122; 365/124; 365/157; 365/234; 365/121
[58] Field of Search ............... 365/215, 106, 122, 124, 365/157, 234, 127, 121; 369/44.37, 44.38, 94; 359/117, 128, 129

[56] References Cited

U.S. PATENT DOCUMENTS

| | | | |
|---|---|---|---|
| 3,391,970 | 7/1968 | Sincerbox | 365/121 |
| 3,438,005 | 4/1969 | Tabor | 365/127 |
| 3,475,738 | 10/1969 | Louis et al. | 365/127 |
| 3,582,877 | 6/1971 | Benoit | 365/122 |
| 3,651,504 | 3/1972 | Goldberg et al. | 365/122 |
| 3,996,570 | 12/1976 | Roberts | 365/124 |

FOREIGN PATENT DOCUMENTS 2293035 6/1976 France.

Primary Examiner—Eugene R. LaRoche
Assistant Examiner—Andrew Tran
Attorney, Agent, or Firm—Douglas R. Millett

[57] ABSTRACT

This application concerns an optical storage with an optical storage medium having a plurality of storage fields arranged in matrix fashion, wherein each storage field of this storage field matrix comprises a storage position matrix consisting of a number of storage positions arranged in matrix fashion, and an X/Y deflection system for random-addressing a storage position of a storage field of the storage field matrix responsive to an X- and a Y-control signal generated by a control unit, so that a light beam impinging on the X/Y deflection system is directed to a storage position of a storage field of the optical storage medium corresponding to the position of the X/Y deflection system. The invention provides for a beam multiplexer to be positioned intermediate the light source and the optical storage medium, by which an incident light beam is fanned into a number of light beams forming a light beam matrix such that each light beam of the light beam matrix is associated with one storage field of the storage field matrix of the optical storage medium, and that, responsive to the control of the X/Y deflection system by the X- and the Y-control signal, each light beam of the light beam matrix impinges on the corresponding storage position of the associated storage field of the storage field matrix, so that at any one time the associated light beam of the light beam matrix impinges on one of the plurality of storage fields.

22 Claims, 5 Drawing Sheets

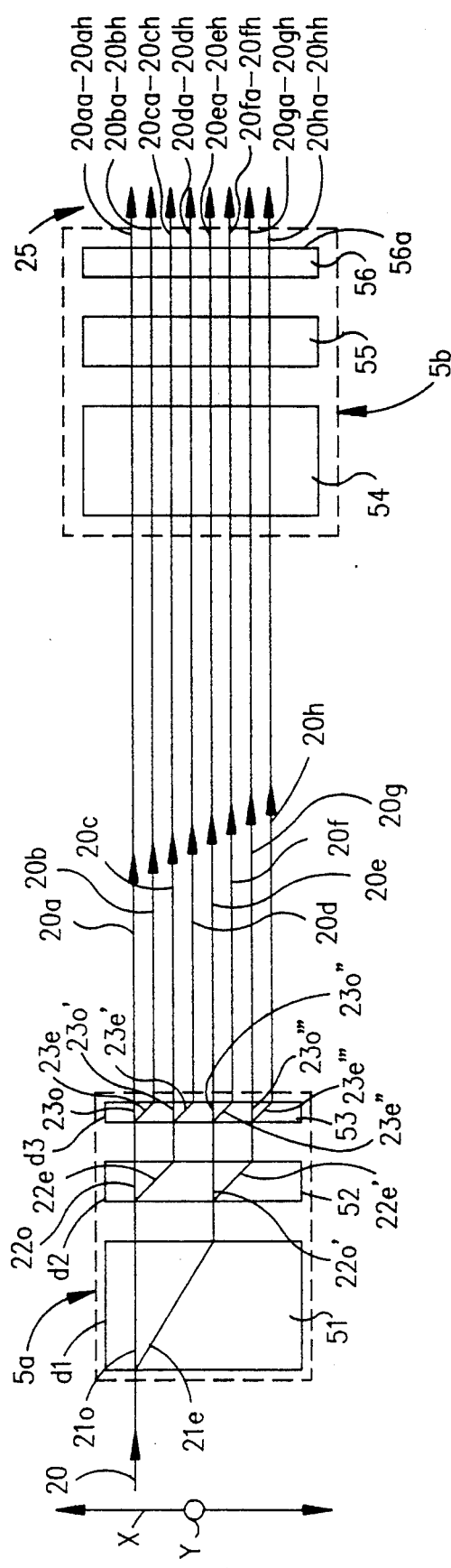
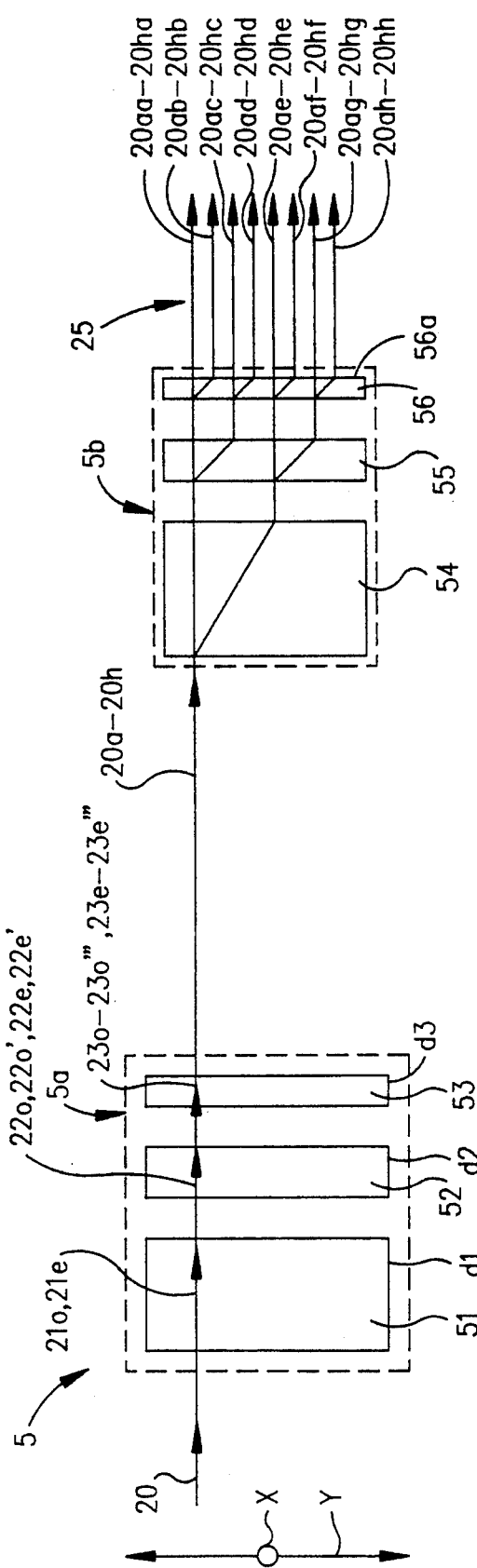
FIG. 4A
FIG. 4B

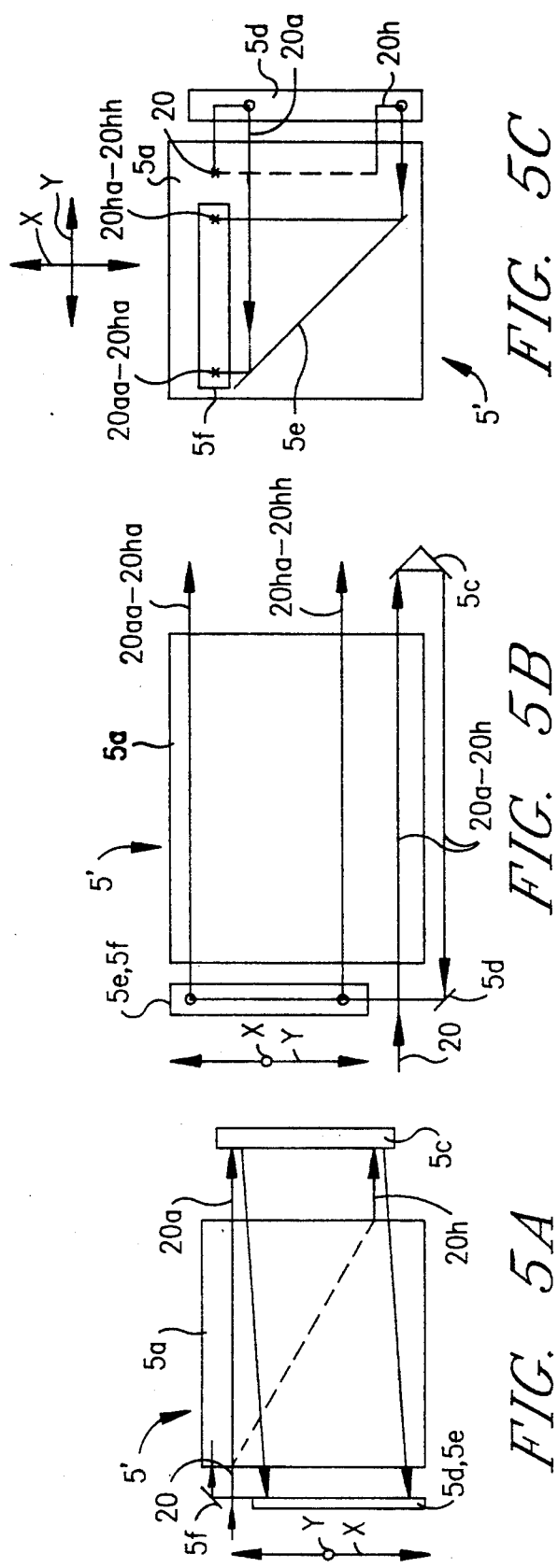
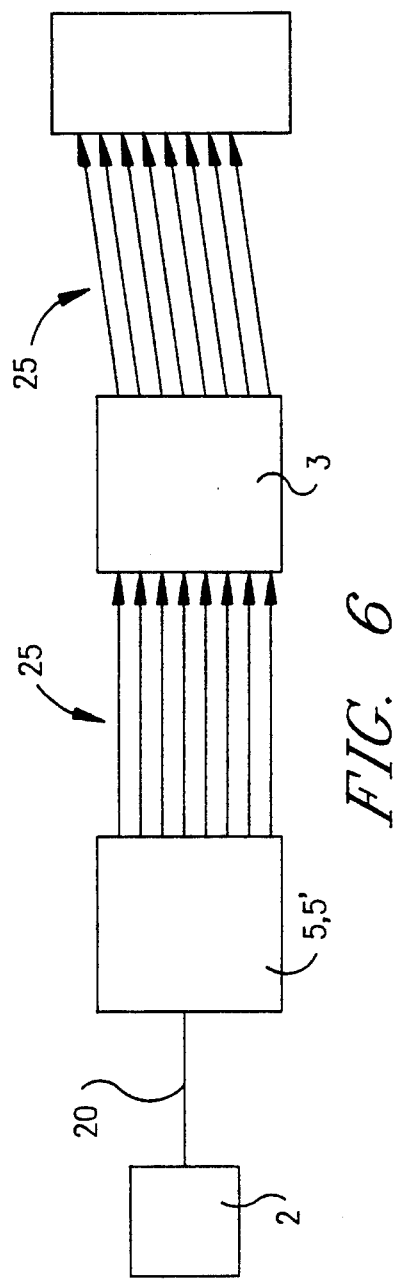

RANDOM ACCESS OPTICAL STORAGE

BACKGROUND OF THE INVENTION

1. Field of the Invention

The invention concerns an optical storage with an optical storage medium consisting of a plurality of storage fields arranged in matrix fashion, wherein each storage field of this storage field matrix comprises a storage position matrix consisting of a plurality of storage positions arranged in matrix fashion, and an X/Y deflection system for random-addressing a storage position of a storage field of the storage field matrix responsive to an X- and a Y-control signal such that a light beam impinging on the X/Y deflection system is directed to a storage position of a storage field of the optical storage medium corresponding to the position of the X/Y deflection system resulting from the two control signals.

2. Description of the Prior Art

Matrix optical storage is known from U.S. Pat. No. 3,996,570. A disadvantage of the known optical storage is that two separate optical devices are required for reading items of data from and writing them into the storage medium. The use of an optical read means and an optical write means separate therefrom with regard to design and function leads to an elaborate design of the optical storage.

The write means used to write data into the optical storage medium has a laser, acting as a light source, which emits a spatially coherent and collimated light beam. Having passed through the electro-optic modulator, the laser beam is directed to the two-stage X/Y deflection system used to random-address the individual storage positions of the storage medium. A storage field deflecting means of the X/Y deflection system selects one of a plurality of storage fields arranged on the storage medium in matrix fashion. An acousto-optic storage position deflecting means of the X/Y deflection system, preceding the storage field deflecting means, serves to random-address a particular storage position of the storage field selected by the storage field deflecting means. Having passed through the two-stage X/Y deflection system, the deflected laser beam is directed to a semi-transparent mirror where it is reflected. The reflected light beam is led via a matrix lens array, by which it is focused, to the storage medium. The influence of the laser beam on a selected storage position of a storage field changes its physical state which is detected during reading by the read means of the optical storage.

The optical read means comprises a matrix light diode array positioned behind the storage medium and fitted with one light diode for each storage field of the storage field medium. The individual light diodes of the matrix light diode array are controlled by the control unit of the optical storage for random-addressing a storage field of the storage medium. The light emitted by a light diode of the matrix light diode array passes through the illuminated storage field of the storage medium to be focused by the matrix lens array preceding the storage medium and to be directed through the semi-transparent mirror to a lens system. This lens system enlarges the image of the illuminated storage field of the storage medium, which is generated by the light diode of the matrix light diode array. This elaborate lens array is necessary for sensing the individual storage positions of the imaged storage field of the storage medium by a detecting means of the optical read means. The detecting means has a plurality of detectors arranged in matrix fashion, the number and arrangement of which correspond to the configuration of the storage positions of one of the storage fields. Apart from separate read and write operations and the previously described disadvantages, this known storage has a number of unfavorable characteristics so that it fails to meet the requirements of up-to-date data processing systems. The storage field deflection means of the optical write means is made up of two mechanically rotatable mirrors which are adjusted by stepper motors. Such mechanical positioning of the rotatable mirrors, used for random storage field deflection, reduces the access speed to a particular storage field of the storage medium.

In addition, the mirror setting is not satisfactorily reproducible. Positioning tolerances which adversely affect the density of the storage positions of the storage medium are caused by mechanically positioning the rotatable mirrors of the storage field deflecting means. The individual storage positions of the storage medium have to be physically spaced such that the laser beam, taking account of positioning tolerances, invariably remains within the area the storage position assumes on the storage medium. In view of the tolerances resulting from mechanical beam positioning, it is impossible to use a highly integrated storage medium in which two neighboring storage positions are arranged closely adjacent to each other. In such a case, the positioning errors occurring in the known X/Y deflection system would lead to faulty access to storage positions and thus to faulty data.

A further disadvantage of the known optical storage in data processing systems is that the data to be stored in the individual positions of the storage medium can only be written in a bit-serial fashion. As a result, only one storage position can be accessed by suitably controlling the storage position and/or the storage field deflecting means. Such time-serial access to the positions of the storage medium falls short of the requirements to be met by the operating speed of up-to-date data processing systems and their interacting optical storages.

SUMMARY OF THE INVENTION

It is the object of the present invention to further develop an optical random-access storage of the above-described kind such that the positions of the storage medium are rapidly accessible.

This object is accomplished according to the invention by a beam multiplexer positioned intermediate the light source and the optical storage medium, said multiplexer fanning an impinging light beam into a plurality of light beams, forming a light beam matrix, such that each light beam of the light beam matrix is associated with one storage field of the storage field matrix of the optical storage medium, and that responsive to the control of X/Y deflection system by the X- and the Y-control signal, each light beam of the light beam matrix impinges on the storage position of the associated storage field of the storage field matrix, so that at any one time the light beam of the light beam matrix impinges on one storage position of the plurality of storage fields.

The measures according to the invention have the advantage that several storage positions of the storage medium are accessed in a bit-serial fashion. The two-dimensional split of the light beam, emitted by the light source, into the light beams of the light beam matrix, as carried out in the beam multiplexer of the optical storage according to the invention, has the special advantage that at any one time there is one light beam impinging on one storage position of each storage field of the storage field matrix of the optical storage medium. This bit-parallel access, by which a plurality of storage positions are simultaneously sensed, ensures an extremely high operating speed of the optical storage.

Another advantage of this bit-parallel access to one position of each storage field of the storage field matrix of the optical storage medium by means of the beam multiplexer according to the invention is that the storage field deflecting means necessary for addressing the individual storage fields of known optical storage media and leading to slow and inaccurate access may be dispensed with. In the optical storage according to the invention it is no longer necessary to select a particular storage field of the storage field matrix by mechanically positioning the rotatable mirrors, as one light beam of the light beam matrix, which is generated in the beam multiplexer, is simultaneously associated with all storage fields of the optical storage medium. The optical storage according to the invention has the further advantage that it may be designed for an extremely high storage position density, as mechanical positioning of the rotatable mirrors of the storage field deflecting means contained in known optical storages and leading to positioning errors is eliminated.

An advantageous further development of the invention provides for the beam multiplexer of the optical storage according to the invention to comprise an X-beam multiplexer and a Y-beam multiplexer following the X-beam multiplexer in the beam path. The X-beam multiplexer splits the light beam emitted by the light source into a number of parallel light beams fanned in an X-direction. The parallel light beams exiting from the X-beam multiplexer impinge on the Y-beam multiplexer. Each of these parallel light beams fanned in the X-direction is split in the Y-beam multiplexer into a plurality of parallel light beams fanned in a Y-direction. The light beams exiting from the Y-beam multiplexer and fanned in the X- and the Y-direction form the light beam matrix. The measures according to the invention allow all storage fields of the storage field matrix of the storage medium to be simultaneously accessed in a simple bit-parallel fashion.

Yet a further favorable development of the invention provides for the X-beam multiplexer and/or the Y-beam multiplexer to consist of a plurality of optically birefringent crystals. The optically birefringent crystals, which preferably consist of calcareous spar, form a beam multiplexer in a particularly simple fashion which is used to two-dimensionally split a light beam and which is marked by a particularly low cost design.

A further advantageous development of the invention provides for an alternative design of the X-beam multiplexer, wherein the X-beam multiplexer is formed by a reversing prism, positioned on the output side of the X-beam multiplexer, and three mirrors positioned on its input side. The parallel light beams fanned in the X-direction and exiting from the X-beam multiplexer are returned by the reversing prism to the first mirror. The parallel light beams reflected from the first mirror are led to the second and the third mirror. The mirrors are positioned such that the parallel light beams fanned in the X-direction and impinging on them enter the X-beam multiplexer staggered in the Y-direction. In the X-beam multiplexer, each of these light beams staggered in the Y-direction is again fanned in the X-direction, with the light beam matrix exiting on the output of the beam multiplexer. A beam multiplexer thus designed is marked in a particularly favorable manner by a simple and compact design, as the reversing prism and the three mirrors replace the Y-beam multiplexer.

A further advantageous development of the invention provides for the alternative design of the beam multiplexer to consist of a glass fiber bundle made up of a plurality of glass fibers. The beam multiplexer is positioned intermediate the light source and the X/Y deflection system and converts the light beam on the input of the glass fiber bundle and emitted by the light source into the light beam matrix, the light beams of which are then directed to the mirror coatings of the X/Y deflection system. The extraordinary feature of such a beam multiplexer is that it is extremely easy to realize, as only conventional glass fibers are required.

A still further development of the invention provides for the X/Y deflection system, which is controlled by the control unit of the optical storage by means of an X- and a Y-control signal, to be formed in the optical storage by two mirror coated piezocrystals. These piezocrystals which serve to random-address the storage positions of the optical storage medium have the advantage of affording extremely fast access times. The piezocrystals are deformed by the reciprocal effect produced by applying the X- and Y-control signal voltages, thus adapting to any changes in these signals almost immediately. The access time is substantially determined by electronic signal processing in the control unit of the optical storage. Two-dimensional beam deflection by means of piezocrystals affords a high degree of reproducibility of the deflection values and an extremely high local resolution for positioning the beams on the optical storage medium.

For a fuller understanding of the nature and advantages of the present invention reference should be made to the following detailed description taken into conjunction with the accompanying drawings.

BRIEF DESCRIPTION OF THE DRAWINGS

FIG. 4A shows a side schematic view of a beam multiplexer;

FIG. 4B shows a top schematic view of the beam multiplexer of FIG. 4A;

FIG. 5A shows a side schematic diagram of an alternative beam multiplexer;

FIG. 5B shows a top schematic diagram of the multiplexer of FIG. 5A;

FIG. 5C shows an end view of a multiplexer of FIG. 5A; and

FIG. 6 shows a schematic diagram of a second embodiment of the optical random-access storage system.

BRIEF DESCRIPTION OF THE PREFERRED EMBODIMENTS

Figure 1:
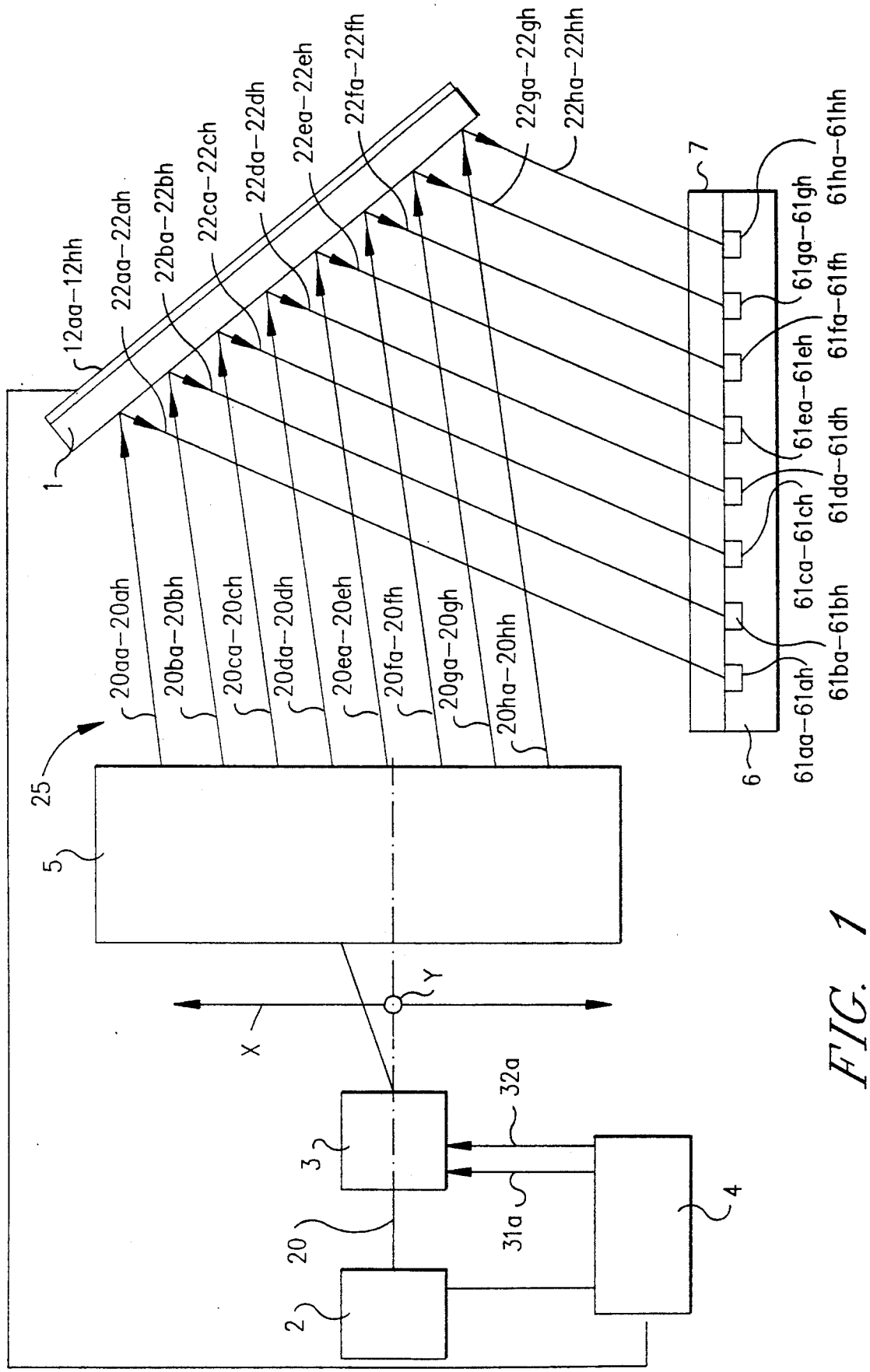
FIG. 1 is a schematic diagram of an optical random-access storage system.

The embodiment of an optical random-access storage shown in FIG. 1 has a laser, acting as a light source 2, which emits a collimated and polarized light beam 20.

Figure 2:
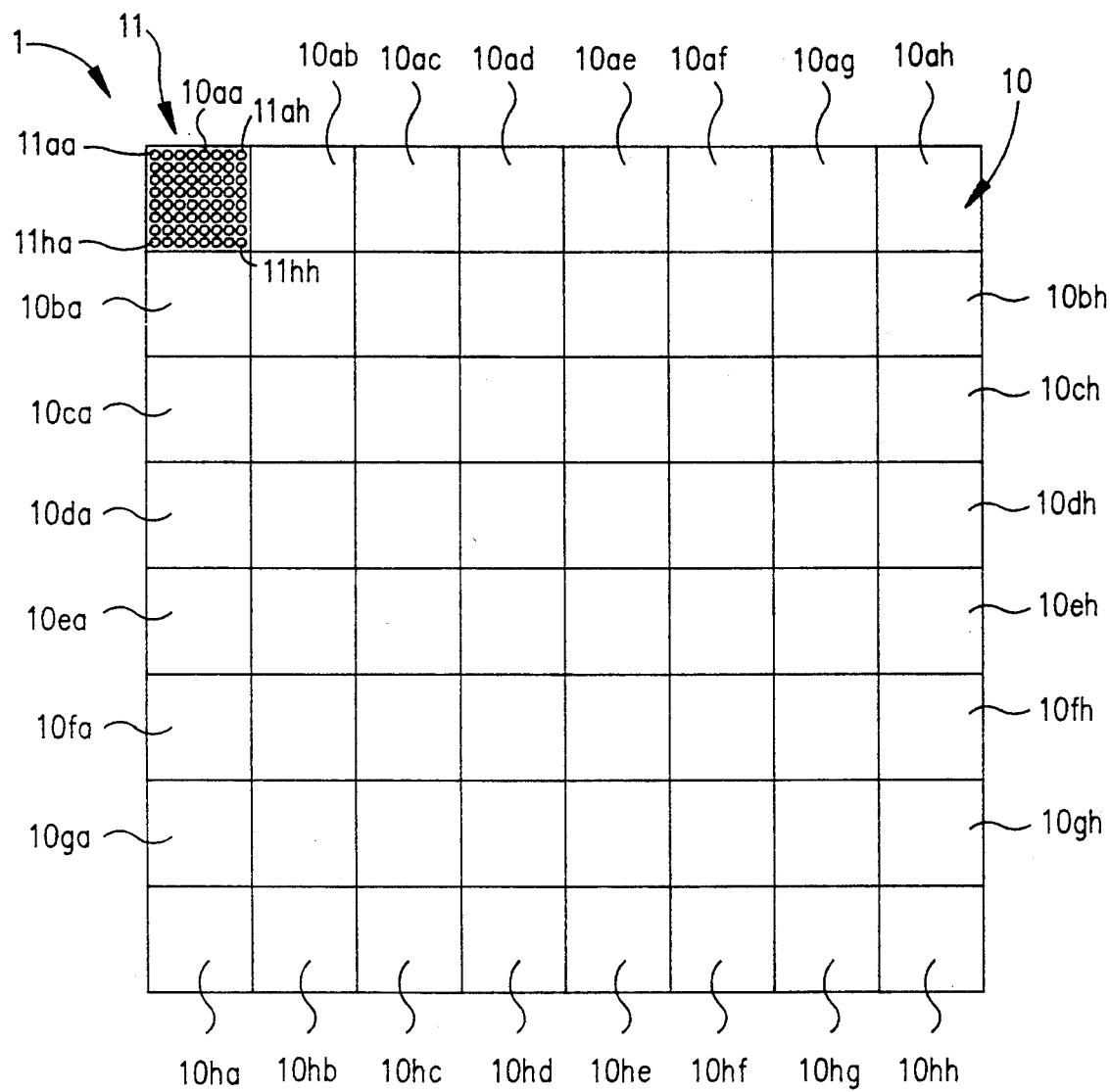
FIG. 2 is a schematic diagram of an optical storage medium of FIG. 1.

The light beam 20 passes through an X/Y deflection system 3 and a beam multiplexer 5 to an optical storage medium 1. The optical storage medium 1 shown in greater detail in FIG. 2 has a plurality of storage fields 10aa–10ah, 10ba–10bh, . . . , 10ha–10hh arranged in a matrix fashion. Each storage field of the storage field matrix 10 of the optical storage medium 1 has a plurality of storage positions 11aa–11hh arranged in matrix fashion. The embodiment of the optical storage medium 1 shown in FIG. 2 concerns a storage field matrix 10 with $m = 8 \times n = 8$ storage fields, wherein each of the $m \times n = 64$ storage fields 10aa–10hh consists of $k = 8 \times 1 = 8$ storage positions 11aa–11hh. The values of k,l,m,n are only examples which allow the embodiment to which they refer to be more readily appreciated. The number m or k or rows of storage fields or storage positions of the storage field matrix 10 or the storage position matrix 11 does not have to correspond to the number n or 1 of columns.

For technical reasons the optical storage medium 1 has been divided into a storage field matrix 10 and storage position matrices 11. As will be explained further on, the division of the optical storage medium 1 is substantially determined by the storage components described below rather than by external factors.

The storage medium 1 is designed in a known manner as a magneto-optical storage medium which is covered with a thin magnetic layer. Under the influence of the light beams on one of the storage positions 11aa–11hh, the magnetized layer of the optical storage medium 1 is heated above the Curie point in that area, so that the magnetic layer of the storage position of the storage medium loses its original magnetization. Behind each storage field 10aa–10hh of the optical storage medium 1 there is a corresponding electromagnet 12aa–12hh which is individually controlled by the control unit 4 of the optical storage. The arrangement of the electromagnets 12aa–12hh is the same as that shown for the storage fields 10aa–10hh in FIG. 2. Each electromagnet generates its own magnetic field, the alignment of which corresponds to the binary state of the binary data bit to be stored in the storage position of its respective storage field.

The external magnetic field, produced by the electromagnet, forces the atoms of the magnetized layer of the heated storage position of the storage medium in a defined direction which is retained after the storage position has cooled down. For reading the storage position, a polarized light beam is used, the energy of which is insufficient for heating the magnetized layer of the optical storage medium above the Curie point. When this laser beam is refleced, the direction of polarization of the incident light beam is rotated by the magneto-optical Kerr effect. This rotation of the direction of polarization is detected as a light intensity change at the detector array 6 as will be described in more detail below.

As is also shown in FIG. 1, the light source 2 is controlled by the control unit 4 of the optical storage such that the pulse duration and the pulse amplitude of the emitted light beam 20 correspond to the above-mentioned requirements with regard to pulse power during reading and writing.

Figure 3A:
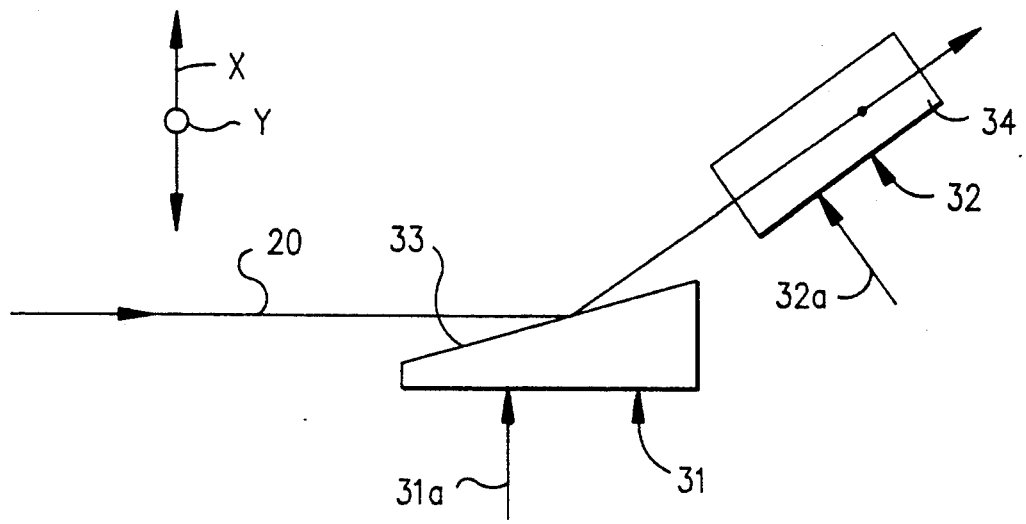
FIG. 3A is a schematic diagram of an X/Y deflection system.

Light beam 20, emitted by light source 2, is led to the X/Y deflection system 3 shown in FIG. 3A. This system deflects light beam 20 in two dimensions in an X-and a Y-direction, respectively, (see also FIG. 1). Two-dimensional deflection of the light beam 20 is carried out in a particularly favorable manner by two mirror-coated piezocrystals. A first piezocrystal 31 of the X/Y deflection system, provided with a mirror coating 33, serves to deflect the light beam 20 in the X-direction. A second piezocrystal 32, provided with a mirror coating 34, deflects light beam 20, reflected from the mirror coating 33 of the first piezo-crystal 31, in the Y-direction. The first and the second piezocrystal 31 and 32 are electrically connected to the control unit 4 of the optical storage by a first and a second control line 31a and 32a. These lines generate an X- and a Y-control signal matching the desired deflection of the light beam 20. By applying the voltage of the X- or the Y-control signal to the first or the second piezo-crystal 31 or 32, the piezo-crystals are deformed by the resultant reciprocal piezoelectric effect. A discrete change of the X/Y control signal changes the position of the mirror coating 33 or 34 of the first or the second piezocrystal 31 or 32 in a defined manner, thus changing the angle of incidence of light beam 20 emitted by light source 2. By suitably controlling the first and/or second piezocrystal 31, 32 by means of the X-and the Y-control signal, generated by control unit 4 of the optical storage, a storage position 11aa–11hh of the storage position matrix 11 may be random-addressed in a particularly simple fashion.

The dimensions k and l of the storage position matrix 11 are substantially determined by how many discrete reproducible voltage values are generated in a voltage range. The number k of storage positions 11aa–11ah of a row or the number 1 of storage positions 11aa–11ha of a column of a storage field 11 of the storage field matrix 10 is essentially determined by the number of discrete voltage values of the X-or the Y-control signal leading to a defined discernible deflection of the first or the second piezocrystal 31 or 32 of the X/Y deflection system 3. The positional change of the light beam's point of incidence on the optical storage medium 1, caused by applying two adjacent discrete voltage values of the X-and Y-control signals, is slightly larger than the expansion of a storage position on the storage medium 1, which is substantially determined by the diameter of the beam impinging on storage medium 1. The use of mirror-coated piezocrystals 31, 32 for two-dimensional beam deflection also has the advantage that the access time to the individual positions of the optical storage medium 1 is extremely short. The first piezocrystal 31 or the second piezo-crystal 32 responds immediately to a change of the X-or the Y-control signal so that the access time is essentially determined by electronic signal processing in the control unit 4, with X/Y deflection being substantially carried out by digital-to-analog conversion. A further advantage of two-dimensional beam deflection by piezo-crystals is the high degree of reproducibility of deflection. Along with the extremely high local resolution for positioning the beam on the optical storage medium 1, this advantage allows using the described storage means also in extremely high density storage media.

Figure 3B:
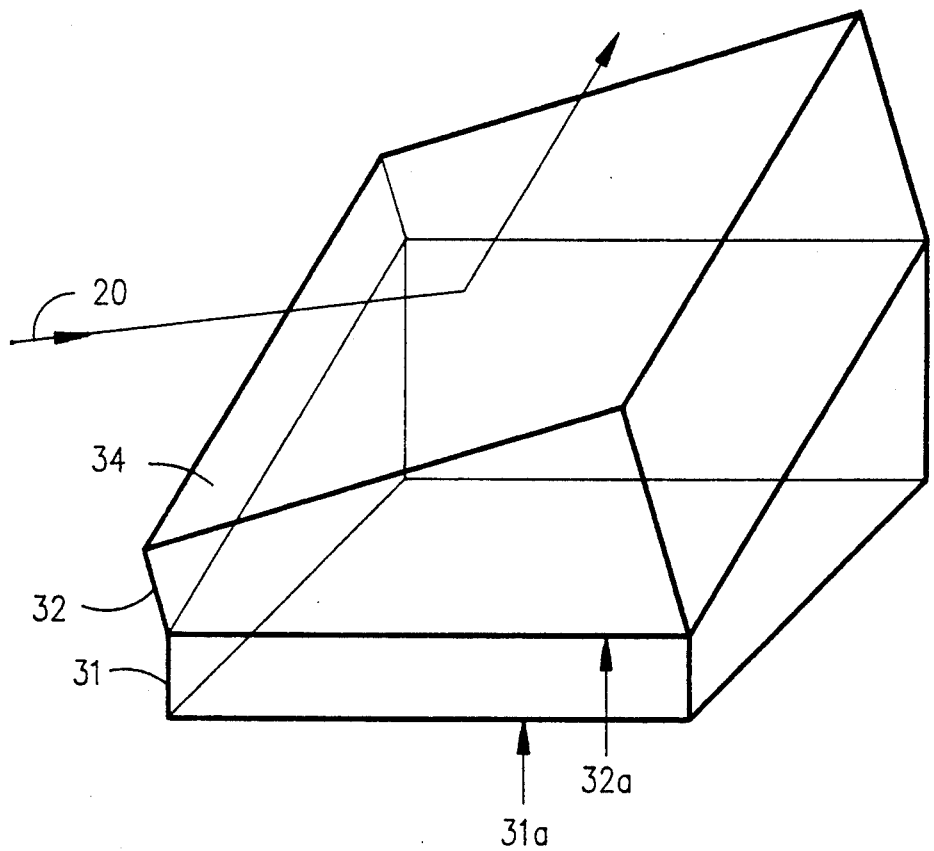
FIG. 3B is a schematic diagram of an alternative embodiment of an X/Y deflection system.

An alternative example of the X/Y deflection system 3 of the optical storage medium is shown in FIG. 3B, which differs from the previously described X/Y deflection system in that the first piezocrystal 31 and the second piezo-crystal 32 are rigidly connected to each other. The function of the X/Y deflection system consisting of the rigidly connected piezocrystals 31 and 32 is similar to that described for the system of FIG. 3A.

Beam 20 which is deflected in two dimensions in the X/Y deflection system 3 is led to a beam multiplexer 5 where it is split into a plurality of parallel light beams. The beam multiplexer 5 shown in FIGS. 4A and B is essentially made up of an X-beam multiplexer 5a and a Y-beam multiplexer 5b. The X-beam multiplexer 5a has a first, a second, and a third optically birefringent crystal 51, 52, 53 by which light beam 20 impinging on the X-beam multiplexer 5a is fanned in the X-direction. The Y-beam multiplexer 5b is analogously made up of a fourth, fifth, and a sixth optically birefringent crystal 54, 55, 56 by which the light beams exiting from the X-beam multiplexer and fanned in the X-direction are fanned in the Y-direction. The optically birefringent crystals 51–56 of the beam multiplexer 5 are preferably made of calcareous spar which has particularly favorable birefringent characteristics. As a result of the optical birefringence in crystals 51–53, the light beam 20 impinging on beam multiplexer 5 is split in the first optically birefringent crystal 51 into two separate beams, namely a first ordinary light beam 21o and a first extraordinary light beam 21e. The first ordinary light beam 21o and the extraordinary light beam 21e exiting from the first optically birefringent crystal 51 impinge on the second optical crystal 52 where they are analogously split into the two second ordinary light beams 22o and 22o' as well as into the two second extraordinary light beams 22e and 22e'. The four light beams 22o, 22o', 22e and 22e', generated in the second optically birefringent crystal 52, reach the third optically birefringent crystal 53 of the X-beam multiplexer 5a where they are split into four third ordinary light beams 23o, 23o', 23o'', 23o''' as well as four third extraordinary light beams 23e, 23e', 23e'', 23e'''.

This functional description of the X-beam multiplexer 5a teaches how a light beam 20 impinging on the X-beam multiplexer 5a is split into a plurality of parallel light beams 20a–20h by several suitably aligned optically birefringent crystals arranged in series. The number of parallel light beams 20a–20h exiting from the X-beam multiplexer 5a is $2^x$, where x is the number of optically birefringent crystals arranged in the X-beam multiplexer 5a. The number of light beams 20a–20h exiting from the X-multiplexer thus determines the number n of storage fields 10aa–10ha of a column of the storage field matrix 10.

An equidistant distribution of the parallel light beams 20a–20h in the X-direction is obtained by matching the thickness values d1, d2, d3 of the optically birefringent crystals 51–53 such that the thickness of a crystal, e.g. the second crystal 52, is half the thickness of the crystal (in this case the first crystal 51) preceding it in the path of light beam 20 through the X-beam multiplexer. For the illustrated example, where the light beam 20 impinging on the X-beam multiplexer 5a is split in an equidistant fashion into eight parallel light beams 20a–20h, the ratio of the thicknesses d1, d2, d3 of the first, second, and third optically birefringent crystals is 4:2:1.

The parallel light beams 20a–20h exiting from X-beam multiplexer 5a are led to the fourth optically birefringent crystal 54 of the Y-beam multiplexer 5b.

In the Y-beam multiplexer 5b, the parallel light beams 20a–20h, previously fanned in the X-direction, are split in the Y-direction. The beam multiplication taking place in the Y-beam multiplexer 5b is shown in FIG. 4B and is similar to beam multiplication previously described with regard to the X-beam multiplexer 5a.

On the output side of the Y-beam multiplexer 5b, i.e. at the end face 56a of the sixth optically birefringent crystal 56, $2^x \times 2^y$ parallel light beams 20aa–20ah, 20ba–bh, . . . , 20ha–20hh are emitted, where y is the number of optically birefringent crystals 54–56 of the Y-beam multiplexer 5b. The number of light beams 20aa–20ah of the light beam matrix 25 exiting from the Y-beam multiplexer 5b in the Y-direction thus determines the number m of storage fields 10aa–10ah of a row of the storage field matrix 10 of the optical storage medium 1.

An essential requirement to be met by the beam multiplexer 5 is that the spatial angle of the light beam 20 impinging on the beam multiplexer 5 and the spatial angle of the parallel light beams 20aa–20hh forming a light beam matrix 25 and exiting from said multiplexer must be correlated. This angular correlation ensures that a particular deflection of light beam 20 in the X/Y deflection system 3 results in an accurately predeterminable deflection of the parallel light beams 20aa–20hh of the light beam matrix 25, so that by suitably controlling the X/Y deflection system 3 by means of the control unit 4, a particular storage position of the storage position matrix 11 of each storage field 10aa–10hh of the storage field matrix 10 of the optical storage medium 1 may be accessed at random. This requirement is met in a particularly favorable manner by the above-described beam multiplexer 5.

An alternative design of the beam multiplexer is shown in FIGS. 5A–5C. This second embodiment 5' is marked in a particularly favorable manner by a highly simplified design. Only one X-beam multiplexer 5a is required. The Y-beam multiplexer 5b is replaced by a reversing prism 5c and three mirrors 5d, 5e, 5f.

The design and function of the beam multiplexer 5' are shown in FIGS. 5A–5C. FIG. 5A is a side view from the Y-direction of FIG. 1. FIG. 5B is a plan view of the beam multiplexer from the X-direction of FIG. 1, and FIG. 5C shows the beam multiplexer 5' as viewed from the impinging light beam 20. As may be seen from the above analogous description, light beam 20 is split in the X-beam multiplexer 5a into a number of parallel light beams 20a–20h fanned in the X-direction. After exiting from the X-beam multiplexer 5a, the parallel light beams 20a–20h are led to the reversing prism 5c by which they are returned from the output side of beam multiplexer 5a to its input side. On the input side, the first mirror 5d is inclined such that the light beams 20a–20h diverted from the reversing prism 5c are changed in their direction such that they extend substantially parallel to the input side of the X-beam multiplexer 5a. The second mirror 5e, following the first mirror 5d in the beam path, deflects the light beams 20a–20h reflected from the first mirror 5d such that their X-fan is converted to a Y-fan. The third mirror 5f guides the light beams extending parallel to the input side and reflected from the second mirror 5e such that they are fanned in the Y-direction and that they enter the X-beam multiplexer 5a parallel to light beam 20 emitted by light source 2. Thus, light beams 20a–20h reach the input side of the beam multiplexer 5a in the Y-direction staggered relative to each other. As a result, each individual light beam 20a–20h is again split in the X-direction, so that the light beam matrix 25 formed by the light beams 20aa–20hh exits on the output side of the beam multiplexer 5a.

Such two-dimensional splitting of the light beam 10 into the parallel light beams 20aa–20hh of the light beam matrix 25 has the special advantage that at any one time only one storage position of each storage field 10aa-10hh of the storage field matrix 10 of the optical storage medium 1 is accessed in a bit-parallel fashion. Thus m×n (here 8×8) bits may be simultaneously stored in a particularly favorable manner in the storage positions of the optical storage. Bit-parallel access reduces the processing time of the bits and leads to a particularly high operating speed of the optical storage.

The data stored in the optical storage medium 1 is read in the same way as it is written, using, as previously mentioned, a low-energy light beam 20 so that the optical storage medium 1 is not heated above the Curie point. The light beams 22aa-22hh reflected from a random-scanned storage position 11aa-11hh of each storage field 10aa-10hh of the storage field matrix 10 are directed through a polarization filter 7 to a detector array 6 comprising a plurality of detectors 61aa-61hh arranged in matrix fashion. The number of detectors 61aa-61hh corresponds to the number of parallel light beams 20aa-20hh generated by the beam multiplexer 5 and forming the light beam matrix 25. Each of the detectors 61aa-61hh of the detector array 6 is associated with one of the reflected light beams 22aa-22hh, recording its intensity which represents the binary content of the respective storage position. As previously described, light hitting the medium 1 has its plane of polarization rotated one way or the other by the Kerr effect depending upon the magnetic orientation of the medium at that spot. The polarization filter 7 is oriented such that light having its plane of polarization rotated one way is substantially rejected and the light having its plane polarization rotated the other way is substantially allowed to pass. The detectors in the detector array 6 sense these changes in light intensity which are representative of the data stored in the medium 1.

FIG. 6 shows a second embodiment of the optical storage with random access. This embodiment is substantially identical to the previously described one, so that like characters of reference are used to identify like elements. The main difference between the two embodiments of an optical storage is that in the second embodiment, the beam multiplexer 5 or 5' precedes the X/Y deflection system 3. The light beam 20 emitted by the light source 2 is only two-dimensionally deflected after it has been split into the light beam matrix 25 consisting of the parallel light beams 20aa-20hh. Consequently, beam multiplexer 5,5' may have a simpler design, as light beam 20 is not always incident at the same angle. Therefore, it is not essential that the spatial angle of the incident light beam 20 and the spatial angle of the exiting parallel light beams 20aa-20hh of the light beam matrix 25 be clearly correlated for beam multiplexer 5 or 5'.

In view of this, the beam multiplexer may consist in a particularly favorable manner of an m×n glass fiber bundle, the input of which receives the light beam 20 emitted by the light source 2. The individual glass fibers of the glass fiber bundle are spaced from each other such that m×n parallel light beams spaced relative to each other exit on the output side of the glass fiber bundle. The light beams of the light beam matrix 25 thus formed are then fed to the X/Y deflection system 3.

The other functions of the second embodiment of the optical storage with random access are obvious to the expert from the previously described first embodiment, so that further details may be omitted.

The above-described embodiments of the optical storage proceed from the assumption that the light beams 20aa-20hh of the light beam matrix 25 extend equidistantly and parallel to each other. Contrary to this assumption however the beam multiplexer may be designed such that the light beams 20aa-20hh of the light beam matrix 25 exiting on its output side are divergent, meaning that the individual light beams 20aa-20hh of the light beam matrix 25 form a light beam pyramid, the tip of which points towards the light source 2. The previously described beam multiplexer consisting of an m×n glass fiber bundle is particularly suitable for generating such a beam course. The individual glass fibers of the bundle are spaced from each other or their exit ends are ground such that the totality of the exiting light beams forms the aforementioned light beam pyramid. Therefore, the term "light beams of the light beam matrix 25", as used in the following claims, implies both parallel and divergent light beams forming a light beam pyramid.

The present invention preferrably uses a magneto-optic medium for medium 1. However, other types of media, such as phase change or ablation, may also be used. Some of these other media do not use Kerr rotation and instead detect data as strictly a change in relfectivity. In such cases, the magnet 12 and polarization filter 7 may be omitted.

While the preferred embodiments of the present invention have been illustrated in detail, it should be apparent that applications and adaptations to those embodiments may occur to one skilled in the art without departing from the scope of the present invention as set forth in the following claims.

What is claimed is:

1. An optical data storage system comprising:
 a radiation generation means for providing a first radiation beam;
 an optical data storage medium having a plurality of storage fields;
 a beam multiplexer means located between the radiation generation means and the optical data storage medium for dividing the first radiation beam into a plurality of parallel first and second multiplexed radiation beams which are oriented along a first direction and a second direction, respectively, the beam multiplexer means comprising a plurality of beam multiplexer birefringent crystals arranged in series along the direction of propagation of the first multiplexed beams, the first of said plurality of beam multiplexer birefringent crystals having a thickness of d along the direction of propagation, and each succeeding one of the plurality of beam multiplexer birefringent crystals having a thickness of about one half of the thickness of the preceding beam multiplexer birefringent crystal, the beam multiplexer means further comprising a reversing prism positioned on an output side of the birefringent crystals, and mirrors positioned on an input side of the birefringent crystals, the first multiplexed radiation beams exiting from the birefringent crystals are fanned in a first direction and are passed via the reversing prism to a first mirror, and the radiation beams reflected from the first mirror are passed to a second mirror which reflects the radiation beams fanned in the first direction such that they are staggered in a second direction to subsequently impinge on a third mirror by which they are entered into the birefringent crystals, the radiation beams entering the birefringent crystals are fanned in the first direction and exit the output side of the birefringent crystals as second multiplexed beams;

a beam direction means located between the radiation generation means and the optical data storage medium for causing the plurality of second multiplexed beams to be directed each to a respective one of the plurality of storage fields;

a plurality of optical detectors for receiving a plurality of reflected radiation beams from the medium and generating a data signal responsive thereto;

a magnetic field means located proximate the optical data storage medium; and a polarization filter located between the medium and the optical detectors.

2. The system of claim 1, wherein the magnetic field means comprises a plurality of electro-magnets, each of which corresponds to one of the plurality of storage fields.

3. The system of claim 1, wherein the beam direction means comprises a first and a second piezocrystal.

4. The system of claim 1, wherein the beam multiplexer birefringent crystals are comprised of calcareous spar.

5. An optical data storage system comprising:
a radiation generation means for providing a first radiation beam;
an optical data storage medium having a plurality of storage fields;
a first beam multiplexer means located between the radiation generation means and the optical data storge medium for dividing the first radiation beam into a plurality of parallel first multiplexed radiation beams which are oriented along a first direction, the first beam multiplexer means comprising a plurality of first beam multiplexer birefringent crystals arranged in series such that from a first end of the series to a second end of the series, a first one of the first beam multiplexer birefringent crystals at the first end has a thickness of d, and in a direction towards the second end of the series, each succeeding one of the plurality of first beam multiplexer birefringent crystals has a thickness of about one-half of the thickness of the preceding first beam multiplexer birefringent crystal, each first beam multiplexer birefringent crystal dividing an incoming beam into two outgoing beams;
a beam direction means located between the radiation generation means and the optical data storage medium for causing a plurality of multiplexed beams to be directed each to a respective one of the plurality of storage fields; and
a plurality of optical detectors for receiving a plurality of reflected radiation beams from the medium and generating a data signal responsive thereto.

6. The optical data storage system of claim 5, further comprising:
a second beam multiplexer means located between the first beam multiplexer means and the optical data storage medium, for dividing each of the plurality of parallel first multiplexed radiation beams into a plurality of parallel second multiplexed radiation beams oriented along a second direction, the second beam multiplexer means comprising a plurality of second beam multiplexer birefringent crystals arranged in series such that from a first end of the series to a second end of the series, a first one of the second beam multiplexer birefringent crystals at the first end has a thickness of d, and in a direction towards the second end of the series, each succeeding one of the plurality of second beam multiplexer birefringent crystals has a thickness of about one-half of the thickness of the preceding second beam multiplexer birefringent crystal, each second beam multiplexer birefringent crystal dividing an incoming beam into two outgoing beams.

7. The optical data storage system of claim 5, further comprising:
a plurality of reflective elements arranged around the first beam multiplexer means, such that each of the first multiplexed radiation beams is divided into a plurality of parallel second multiplexed radiation beams oriented along a second direction.

8. The system of claim 5, wherein the optical data storage medium comprises a magneto-optic material.

9. The system of claim 8, further comprising:
a magnetic field means located proximate the optical data storage medium; and
a polarization filter located between the medium and the optical detectors.

10. The system of claim 9, wherein the magnetic field means comprises a plurality of electro-magnets, each of which corresponds to one of the plurality of storage fields.

11. The system of claim 5, wherein the beam direction means comprises a first and a second piezocrystal.

12. The system of claim 5, wherein the first beam multiplexer birefringent crystals are comprised of calcareous spar.

13. An optical data storage system comprising:
a radiation generation means for providing a first radiation beam;
an optical data storage medium comprised of a magneto-optic material having a plurality of storage fields;
a first beam multiplexer means located between the radiation generation means and the optical data storage medium for dividing the first radiation beam into a plurality of parallel first multiplexed radiation beams which are oriented along a first direction, the first beam multiplexer means comprising a plurality of first beam multiplexer birefringent crystals arranged in series such that from a first end of the series to a second end of the series, a first one of the first beam multiplexer birefringent crystals at the first end has a thickness of d, and in a direction toward the second end of the series, each succeeding one of the plurality of first beam multiplexer birefringent crystals has a thickness of about one-half of the thickness of the preceding first beam multiplexer birefringent crystal, each first beam multiplexer birefringent crystal dividing an incoming beam into two outgoing beams;
a second beam multiplexer means located between the first beam multiplexer means and the optical data storage medium, for dividing each of the plurality of parallel first multiplexed radiation beams into a plurality of parallel second multiplexed radiation beams oriented along a second direction, the second beam multiplexer means comprising a plurality of second beam multiplexer birefringent crystals arranged in series such that from a first end of the series to a second end of the series, a first one of the second beam multiplexer birefringent crystals at the first end has a thickness of d, and in a direction toward the second end of the series, each succeeding one of the plurality of second beam multiplexer birefringent crystals has a thickness of about one-half of the thickness of the preceding second beam multiplexer birefringent crystal, each second beam multiplexer birefringent crystal dividing an incoming beam into two outgoing beams;

a beam direction means located between the radiation generation means and the optical data storage medium for causing the plurality of multiplexed beams to be directed each to a respective one of the plurality of storage fields;

a plurality of optical detectors for receiving a plurality of reflected radiation beams from the medium and generating a data signal responsive thereto;

a magnetic field means located proximate the optical data storage medium; and a polarization filter located between the medium and the optical detectors.

14. The system of claim 13, wherein the magnetic field means comprises a plurality of electro-magnets, each of which corresponds to one of the plurality of storage fields.

15. The system of claim 13, wherein the beam direction means comprises a first and a second piezocrystal.

16. The system of claim 13, wherein the first and second beam multiplexer birefringent crystals are comprised of calcareous spar.

17. An optical data storage system comprising:

a radiation generation means for providing a first radiation beam;

an optical data storage medium having a plurality of storage fields;

a beam multiplexer means located between the radiation generation means and the optical data storage medium for dividing the first radiation beam into a plurality of parallel first and second multiplexed radiation beams which are oriented along a first direction and a second direction, respectively, the beam multiplexer means comprising a plurality of beam multiplexer birefringent crystals arranged in series such that from a first end of the series to a second end of the series a first one of the beam multiplexer birefringent crystals at the first end has a thickness of d, and in a direction toward the second end of the series, each succeeding one of the plurality of beam multiplexer birefringent crystals has a thickness of about one-half of the thickness of the preceding beam multiplexer birefringent crystal, each beam multiplexer birefringent crystal dividing an incoming beam into two outgoing beams, the beam multiplexer means further comprising a plurality of reflecting elements, the plurality of birefringent crystals receiving the first radiation beam and producing a plurality of first multiplexed beams in a first beam plane, the plurality of reflecting elements receiving the first multiplexed beams and rotating the first beam plane substantially 90° and transmitting the first multiplexed beams through the birefringent crystals such that the plurality of first and second multiplexed beams are produced;

a beam direction means located between the radiation generation means and the optical data storage medium for causing the plurality of second multiplexed beams to be directed each to a respective one of the plurality of storage fields;

a plurality of optical detectors for receiving a plurality of reflected radiation beams from the medium and generating a data signal responsive thereto;

a magnetic field means located proximate the optical data storage medium; and a polarization filter located between the medium and the optical detectors.

18. The system of claim 17, wherein the magnetic field means comprises a plurality of electro-magnets, each of which corresponds to one of the plurality of storage fields.

19. The system of claim 17, wherein the beam direction means comprises a first and a second piezocrystal.

20. The system of claim 17, wherein the beam multiplexer birefringent crystals are comprised of calcareous spar.

21. The system of claim 17, wherein the reflecting elements comprise five reflecting surfaces.

22. The system of claim 17, wherein the reflecting surfaces comprise a reversing prism and three mirrors.

* * * * *

UNITED STATES PATENT AND TRADEMARK OFFICE
CERTIFICATE OF CORRECTION

PATENT NO. : 5,311,474
DATED : May 10, 1994
INVENTOR(S) : N. Urban

It is certified that error appears in the above-indentified patent and that said Letters Patent is hereby corrected as shown below:

On the title page, and Column 1, line 2
IN THE TITLE

After "STORAGE", insert-- HAVING BEAM MULTIPLEXER --.

Signed and Sealed this

Twenty-third Day of May, 1995

Attest:

BRUCE LEHMAN

*Attesting Officer*     *Commissioner of Patents and Trademarks*